Oct. 29, 1935.  R. W. MUELLER  2,019,193
BALANCED THROTTLE VALVE
Filed March 7, 1931
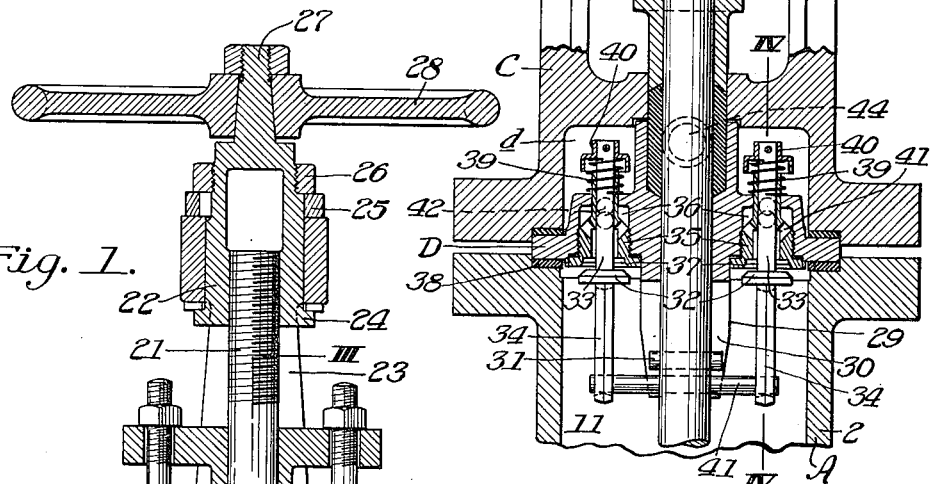
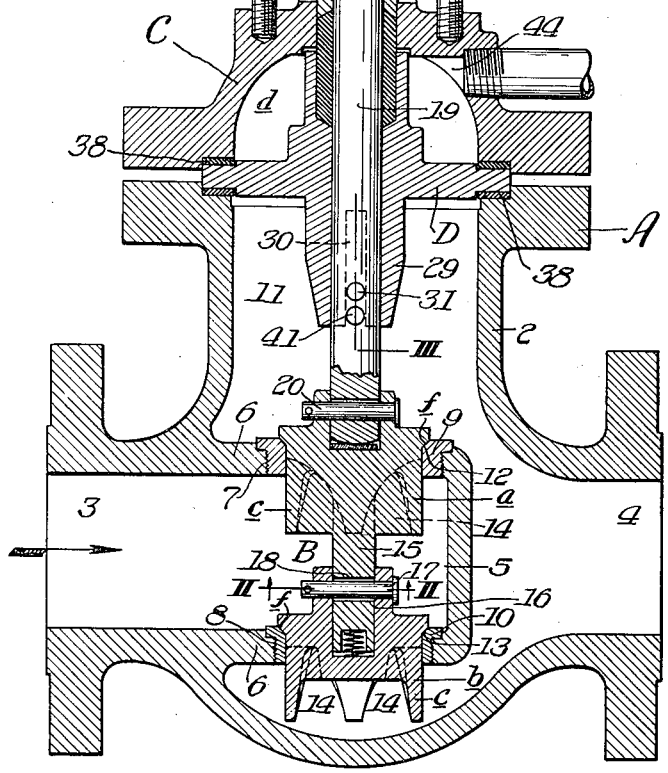
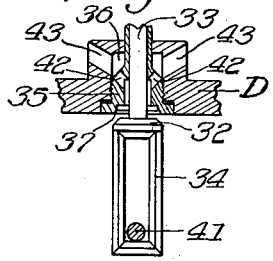
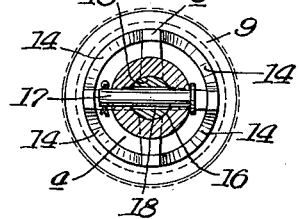
INVENTOR.
BY R. W. Mueller
W. G. Doolittle
ATTORNEY Patented Oct. 29, 1935

2,019,193

UNITED STATES PATENT OFFICE 2,019,193

BALANCED THROTTLE VALVE

Richard W. Mueller, Pittsburgh, Pa., assignor to Kerotest Manufacturing Company, Pittsburgh, Pa., a corporation of Pennsylvania Application March 7, 1931, Serial No. 520,836

4 Claims. (Cl. 277—9)

My invention relates to improvements in valves, and more particularly to that class of valves known in the art as throttle valves, generally employed for controlling the admission of steam or other fluid to prime movers or the like. A valve of this character is shown in U. S. Letters Patent No. 1,928,071 of September 26, 1933.

This invention contemplates a valve structure embodying a balanced throttle valve proper comprising a plurality of parts, detachably and adjustably secured together, and a pressure release valve means cooperating therewith for opening the prime mover side of the valve to the atmosphere when the throttle valve is in closed position, thereby preventing any dangerous accumulation of pressure in the prime mover.

It is a prime object of the present invention to provide a balanced throttle valve embodying two valve seating members or portions for engaging spaced-apart valve seats, and cooperating means for effecting an automatic axial adjustment of the seating members relative to each other to insure a positive seating of both of said members when the throttle valve is in closed position.

A further object is to provide a throttle valve having two spaced-apart valve seating members or portions of substantially the same effective pressure area.

Additional objects and advantages are, to provide for ready replacement of the throttle valve without the usual grinding or machining within the valve body; and to provide a threaded non-rotatable stem for the throttle valve adapted for translation by means exterior of the valve body, whereby the threaded portion of the stem is not subjected to the action of the fluid passing through the valve, and may be lubricated.

In my improved construction, the valve members may be ground to fit their respective seats within generous working limits, and then assembled within the valve body in axial alinement but with a provision for axial self-adjustment, thereby dispensing with the inaccurate, inefficient and expensive double seating construction on present integral balanced throttle valves.

My invention may be more readily understood from the following description taken in connection with the accompanying drawing, wherein:

Fig. 1 is a central vertical section taken through a valve structure embodying my invention, showing the throttle valve in closed position;

Fig. 2, a cross section taken on the line II—II of Fig. 1;

Fig. 3, a vertical section taken on the line III—III of Fig. 1; and

Fig. 4, a fragmentary section taken on the line IV—IV of Fig. 3.

Referring to the drawing, the valve structure, generally designated A, includes a hollow T-shaped casing or body 2, having alined inlet and outlet passages 3 and 4 respectively, and a fluid chamber or chest 5 in open communication with the inlet passage 3. Opposite walls 6 of the chamber 5 are formed with fluid inlet ports 7 and 8, preferably threaded to receive valve seat members 9 and 10 respectively. The said ports 7 and 8 and their seats are arranged in substantial alinement with the head portion 11 of the valve.

A characteristic and important feature of my invention resides in the construction of the throttle valve B; as illustrated and as preferred, it comprises a divided structure bridging, and adapted to control, the inlet ports 7 and 8, and includes two substantially similar members $a$ and $b$ each formed with inclined seating faces $f$ for engagement with inclined faces 12 and 13 of the seat members 9 and 10.

The valve members $a$ and $b$ are each formed with a depending hollow sleeve portion $c$ having a plurality of ports 14 therein, said ports being substantially triangular in configuration to provide for sensitive control.

The valve member $a$ is provided with a depending central stem or connecting member 15, preferably integral therewith and adapted to be received and secured within a centrally positioned socket 16 in the valve member $b$. A transverse pin 17 is removably secured in said member $b$, and passes through an enlarged transverse opening 18 in the member 15, the diameter of the opening 18 being greater than the diameter of the pin. It will be noted that the manner of connecting the parts $a$ and $b$, as just described, provides for an automatic self-adjustment axially between the parts or members $a$ and $b$, when moved into closed or contacting position with the seats 9 and 10, thus compensating for wear, etc. on the contacting surfaces.

The divided valve proper B is formed of two members $a$ and $b$ having substantially equal effective areas, which is highly important in connection with the double seating arrangement to provide perfect equalization of pressure, and therefor perfect balance. This perfection of balance has not been attained heretofore in constructions comprising a double seating valve of unitary or integral construction, due to the fact that the two valve seats and valve portions had to be of different dimensions to permit assembly thereof into the valve body.

The divided construction of the balanced throttle valve B of my invention may be readily assembled within the valve body and the chamber 5 by lowering seat member 10 through the port 7 and screwing it into its opening 8, placing seat member 9 in the opening 7, and then passing valve member b through the inlet passage 3 into the chamber 5, and placing it on its seat 13. The valve member a is then lowered into place with its portion 15 engaging in the socket 16, after which the parts are adjustably connected by passing pin 17 through openings in member b and the enlarged opening 18 of stem 15.

It will readily be seen that such construction enables the grinding or finishing of the valve seats and the seating faces of the valve members a and b prior to their assembly, without the high degree of accuracy required in the prior unitary construction requiring a fixed dimension between the seats.

For the purpose of operating the valve B within the casing 2, I provide a stem 19 translatable centrally of the head portion 11, and having its lower end secured to the valve member a as by means of a transverse pin 20.

Said stem extends outwardly through the hollow valve bonnet C, and is formed with a threaded portion 21 for engagement with a threaded sleeve 22 rotatably mounted within the valve bonnet yoke 23. The sleeve 22 is retained in the yoke by means of a shoulder 24, a keyed collar 25, and a nut 26, and has a projecting stud 27 for receiving and retaining a hand wheel 28 thereon.

Positioned between the portion 11 of the valve body 2 and the bonnet C, and secured therebetween, I provide a head or plate D having a depending portion 29. Said portion 29 is diametrically slotted, as at 30, to receive a transverse pin 31, the latter being secured to the stem 19 and serving to prevent the rotation thereof during its translation.

Mounted in the head D and designed for cooperation with the valve stem 19, are a plurality of pressure release valves 32 having valve stems 33 and yokes 34. These valves 32 are designed to cooperate with plugs 35 screw-threaded into suitable openings 36 in the head D, said plugs being formed with valve seats 37 therein. The valve stems 33 and the plugs 35 extend upwardly beyond the head D into a chamber d in the bonnet C, which chamber is sealed from the valve head portion 11 by means of suitable packing 38. Springs 39 and spring caps 40 are provided on the valve stems 33, tending to urge the valves 32 to closed position.

In the preferred embodiment of my invention, I have shown two valves 32 arranged on opposite sides of the stem 19 and a cross pin 41 secured in the stem 19 and extending laterally therefrom to engage the yokes 34. The location of the pin 41 with respect to the yokes is such that when the valve B is in the closed position of the drawing, the valves 32 will be opened, thereby permitting any back pressure in the prime mover to which the valve structure A is applied, to be exhausted to the atmosphere through ports 42 in the plugs 35, ports 43 in the head D, and an exhaust opening 44 from the chamber d in the bonnet.

Upon the translation of the stem 19 to open the valve B, the pin 41 will permit the release valves 32 to become seated by the action of their springs 39, thereby closing the valve structure to the atmosphere. A continued opening of the valve B will not affect the valves 32, due to the elongated openings in the yokes 34.

In operation, it will be seen that upon lowering the operating stem 19 to close the throttle valve, the lower member b, due to its weight together with the pressure on the top thereof, will carry the pin 17 into contact with the lowermost inner wall surface of the enlarged opening 18, and consequently, member b will be carried into seating contact with its seat 10 slightly in advance of the seating contact of member a with its seat 9. By the provision of the enlarged opening 18 and the pin 17, not only is there an adjustable connection made between the two members, but compensating means are provided for any wear that may occur in any of the contacting seating faces.

I claim:

1. In a valve of the class described, a body, a chest in the body having alined inlet ports, a balanced throttle valve bridging and controlling the ports having spaced-apart seat contacting members, a plate closing the body on one side of the valve chest, a non-rotatable rising throttle valve stem operable through the plate, said body having an exhaust passage, a valve on the plate for controlling the exhaust passage, and means operatively connecting the exhaust valve and the stem.

2. In a valve of the class described, a body, a chest in the body having alined inlet ports, a balanced throttle valve bridging and controlling the ports having spaced-apart seat contacting members, means adjustably connecting said members, a plate closing the body on one side of the valve chest, a non-rotatable rising throttle valve stem operable through the plate, said body having an exhaust passage, a valve on the plate for controlling the exhaust passage, and means operatively connecting the exhaust valve and the stem.

3. In a valve of the class described, a body, a chest in the body having alined inlet ports, a balanced throttle valve bridging and controlling the ports having spaced-apart seat contacting members, means adjustably connecting said members, a plate closing the body on one side of the valve chest, a bonnet on the plate and cooperating therewith to form a fluid exhaust chamber, a non-rotatable rising throttle valve stem operable through the plate, said body having an exhaust passage in communication with the fluid exhaust chamber, a valve on the plate for controlling the exhaust passage, and means operatively connecting the exhaust valve and the stem.

4. In a valve of the class described, a body, a chest in the body having alined inlet ports, a balanced throttle valve bridging and controlling the ports and having spaced-apart seat contacting members, a non-rotatable rising throttle valve stem, said body having an exhaust passage, an auxiliary valve for controlling the exhaust passage, resilient means for moving the auxiliary valve to its closed position, and connections between the auxiliary valve and the throttle valve stem exerting pressure against the resilient means to maintain the auxiliary valve open while the throttle valve is closed, said connections including a projection on the throttle valve stem and a cooperating yoke-like member carried by the auxiliary valve in which the projection moves.

RICHARD W. MUELLER.